(12) United States Patent
Yamamoto et al.

(10) Patent No.: US 7,172,509 B2
(45) Date of Patent: Feb. 6, 2007

(54) DAMPER MECHANISM AND DAMPER DISK ASSEMBLY

(75) Inventors: Kozo Yamamoto, Osaka (JP); Hiroshi Uehara, Osaka (JP)

(73) Assignee: Exedy Corporation, Osaka (JP)

( * ) Notice: Subject to any disclaimer, the term of this patent is extended or adjusted under 35 U.S.C. 154(b) by 65 days.

(21) Appl. No.: 10/787,171

(22) Filed: Feb. 27, 2004

(65) Prior Publication Data

US 2004/0185940 A1    Sep. 23, 2004

(30) Foreign Application Priority Data

Mar. 18, 2003   (JP)   ............................. 2003-073878

(51) Int. Cl.
*F16F 15/121* (2006.01)
(52) U.S. Cl. .................... 464/68.8; 192/3.29
(58) Field of Classification Search ............... 464/68.8; 192/213.2, 3.29, 213.21, 213.22
See application file for complete search history.

(56) References Cited

U.S. PATENT DOCUMENTS

| | | | | |
|---|---|---|---|---|
| 3,138,011 | A | * | 6/1964 | Stromberg ............. 464/68.8 X |
| 4,138,003 | A | * | 2/1979 | Malloy ................. 192/213.2 X |
| 4,190,142 | A | * | 2/1980 | Berlioux |
| 4,333,552 | A | * | 6/1982 | LaMarche .................. 192/3.29 |
| 4,347,717 | A | * | 9/1982 | Lamarche ............ 192/213.2 X |
| 4,422,535 | A | * | 12/1983 | Ling .................... 192/213.2 X |
| 4,530,673 | A | | 7/1985 | Lamarche |
| 4,559,024 | A | * | 12/1985 | Tamura et al. ......... 464/68.8 X |
| 4,892,008 | A | * | 1/1990 | Naudin et al. ............. 464/68.8 |
| 5,915,511 | A | * | 6/1999 | Yamaguchi ................ 192/3.29 |
| 6,047,804 | A | * | 4/2000 | Feldhaus et al. ..... 192/213.2 X |
| 6,244,963 | B1 | | 6/2001 | Hashimoto et al. |
| 6,251,018 | B1 | * | 6/2001 | Hashimoto et al. .... 464/68.8 X |
| 6,306,043 | B1 | * | 10/2001 | Annic et al. ............... 464/68.8 |
| 2002/0039925 | A1 | | 4/2002 | Uehara |
| 2005/0023103 | A1 | * | 2/2005 | Mizukami ................ 192/213.2 |

FOREIGN PATENT DOCUMENTS

| | | |
|---|---|---|
| DE | 3240238 A1 | 5/1983 |
| DE | 19916871 A1 | 10/1999 |
| DE | 10146904 A1 | 5/2002 |

* cited by examiner

*Primary Examiner*—Greg Binda
(74) *Attorney, Agent, or Firm*—Global IP Counselors, LLP

(57) ABSTRACT

A damper mechanism or a damper disk assembly realizing a low rigidity using a pair of elastic members is provided to achieve a further low rigidity in a region with small torques. The damper mechanism has a drive member 52, a driven member 53, a pair of first torsion springs 58A and 58B, and a second torsion spring 59. The springs 58A and 58B are functionally provided in series with each other in a rotational direction. The spring 59 is functionally provided in parallel with the springs 58A and 58B in such a way that the spring 59 is compressed in the rotational direction after the springs 58A and 58B are compressed to a certain angle when the drive member 52 and the driven member 53 rotate relative to each other.

21 Claims, 5 Drawing Sheets

DAMPER MECHANISM AND DAMPER DISK ASSEMBLY

BACKGROUND OF THE INVENTION

1. Field of the Invention

The present invention relates to a damper mechanism and a damper disk assembly for transmitting torque and absorbing torsion vibrations. More specifically, the present invention relates to a damper mechanism and a damper disk assembly that contain a pair of elastic members functionally provided in series with each other.

2. Background Information

A damper mechanism is typically used in a power transmission system for absorbing and attenuating torsional vibrations as well as transmitting torque. The damper mechanism is typically equipped with a first rotating member, a second rotating member, and torsion springs or elastic members. The elastic members or torsion springs are placed between the two rotating members, and are compressed when the two rotating members rotate relative to each other. A typical torsion spring is made of a coil spring. A typical elastic member can be made of rubber or plastic. A damper mechanism can be built into such devices as a clutch disk assembly, a flywheel assembly, and a lockup device of a torque converter.

A coil spring used in a damper mechanism is typically an arc type that extends in an elongated arc shape along the rotational direction of the damper mechanism in order to achieve a low rigidity and a wide torsion angle of the damper mechanism. However, an arc type coil spring tends to have a problem in that the middle section of the coil spring moves outward in the radial direction during the compression cycle due to the radially outward component force and thus, rubs against other components. This increases the friction resistance and hampers the vibration absorption function of the damper mechanism.

As shown in Japanese Patent Application Publication H1-46746, which is hereby incorporated by reference, a solution for such a problem using a structure of having a pair of coil springs instead of an arc type coil spring is well known. An intermediate float member is placed between the ends of the pair of coil springs in the rotational direction.

The damper mechanism disclosed by H1-46746 has a problem in that although it provides a certain level of low rigidity characteristics due to a pair of coil springs functionally provided in series with each other in the rotational direction, it is difficult to achieve a multi-stage characteristic while realizing a low torsion rigidity at least in the low torque region. Thus, further improvement of the characteristics is hindered with the conventional structures.

In view of the above, it will be apparent to those skilled in the art from this disclosure that there exists a need for an improved damper mechanism and damper disk assembly. This invention addresses this need in the art as well as other needs, which will become apparent to those skilled in the art from this disclosure.

SUMMARY OF THE INVENTION

An object of the present invention is to achieve even lower rigidities in smaller torque regions in a damper mechanism and a damper disk assembly in which a low rigidity is already realized using a pair of elastic members.

A damper mechanism in accordance with a first aspect of the present invention is equipped with a first rotating member, a second rotating member, a pair of first elastic members, and a second elastic member. The second rotating member is rotatable relative to the first rotating member. The first elastic members are aligned with each other in a rotational direction and are functionally provided in series with each other in the rotational direction. The second elastic member is functionally provided in parallel with the pair of first elastic members in the rotational direction in such a way that the second elastic member is compressed in the rotational direction after the pair of first elastic members is compressed beyond a certain angle when the first rotating member and the second rotating member rotate relative to each other.

In this damper mechanism, the compression of the pair of first elastic members begins when the first rotating member and the second rotating member rotate relative to each other. At this time, a relatively low rigidity is achieved as the pair of first elastic members is compressed in the rotating direction. When the relative rotation between the first rotating member and the second rotating member reaches a certain angle, the compression of the second elastic member starts. At this time, a relatively high rigidity is achieved as the second elastic member is compressed in parallel with the pair of first elastic members in the rotating direction. Consequently, the combination of the pair of first elastic members and the second elastic member results in a characteristic having a combination of low rigidity and high rigidity and in improved noise and vibration suppression performance. Moreover, by realizing the aforementioned second stage characteristic, it is possible to realize an even lower rigidity in the first stage when compared to conventional damper mechanisms, which is a region with a lower torque.

A damper mechanism in accordance with a second aspect of the present invention is the damper mechanism of the first aspect, wherein the second elastic member and the first pair of elastic members are aligned in the rotational direction. Since the second elastic member and the pair of first elastic members are aligned in the rotational direction in this damper mechanism, the radial dimension of the damper mechanism does not increase unnecessarily to accommodate the placement of the second elastic member. As a result, it is possible to achieve the aforementioned two stage torsion characteristics and improved noise and vibration suppression performance even when there is limited space in the radial direction. What is meant here by "aligned in the rotational direction" is that the positions in the rotational direction are offset, i.e., the rotational positions do not match. In other words, the second and first elastic members lie on the same circumference relative to the axis of rotation of the damper mechanism, but would not lie on the same radius relative the axis.

A damper mechanism in accordance with a third aspect of the present invention is the damper mechanism of the second aspect, and provides a plurality of pairs of first elastic members. A plurality of second elastic members are also provided, which are placed between or interposed by the plurality of pairs of the first elastic members respectively in the rotational direction.

Since the two second elastic members of this damper mechanism, for example, are placed between the two pairs of first elastic members in the rotational direction, the radial dimension of this damper mechanism does not increase unnecessarily to accommodate the placement of the second elastic members.

A damper mechanism in accordance with a fourth aspect of the present invention is the damper mechanism of the second or third aspect, wherein the second elastic member is placed in such a way that the area of a radial position of the second elastic member and the area of a radial position of the first elastic members at least have portions that are equidistant from the axis of rotation. Since the radial position of the second elastic members at least overlaps with that of the pair of first elastic members in terms of distance from the axis in this damper mechanism, the radial dimension of this damper mechanism does not increase unnecessarily to accommodate the placement of the second elastic members.

A damper mechanism in accordance with a fifth aspect of the present invention is the damper mechanism of the fourth aspect, wherein the second elastic member is placed in the same radial direction position as that of the first elastic members. In other words, the second elastic member and the first elastic members are equidistant from the axis of rotation. Since the radial position of the second elastic members is the same as that of the first elastic members in this damper mechanism, the radial dimension of this damper mechanism does not increase unnecessarily to accommodate the placement of the second elastic members.

A damper mechanism in accordance with a sixth aspect of the present invention is the damper mechanism of the first to fifth aspects, and further includes a supporting member placed between the first elastic members of the pair in the rotational direction to support the pair of first elastic members at their ends in the rotational direction. Since the supporting member supports the pair of first elastic members at their ends in the rotational direction, the positions of the pair of first elastic members are properly maintained in this damper mechanism.

A damper disk assembly in accordance with a seventh aspect of the present invention is equipped with a first disk member, a second disk member, a pair of first elastic members, and a second elastic member. The first disk member has first and second supporting parts aligned in the rotational direction. The second disk member is placed on one side of the first disk member in the axial direction. Further, the second disk member has first and second supporting areas corresponding to the first and second supporting parts respectively. The pair of first elastic members is aligned inside the first supporting part and the first supporting area. The first elastic members are aligned in the rotational direction and functionally provided in series with each other in the rotational direction. The second elastic member is placed in the second supporting part and in the second supporting area. The second elastic member is functionally provided in parallel with the pair of first elastic members in the rotational direction in such a way that the second elastic member is compressed in the rotational direction after the pair of first elastic members is compressed to a certain angle.

In this damper disk assembly, the compression of the pair of first elastic members begins when the first disk member and the second disk member rotate relative to each other. At this time, a relatively low rigidity is achieved as the pair of first elastic members is compressed in the rotating direction. When the relative rotation between the first rotating member and the second rotating member reaches a certain angle, the compression of the second elastic member starts next. As this time, a relatively high rigidity is achieved as the second elastic member is compressed in parallel to the pair of the first elastic members in the rotating direction. Consequently, the combination of the pair of the first elastic members and the second elastic member results in a characteristic having a combination of low rigidity and high rigidity.

A damper disk assembly in accordance with an eighth aspect of the present invention is the damper disk assembly of the seventh aspect, wherein the second elastic member and the pair of first elastic members are aligned in the rotational direction. Since the second elastic member and the pair of first elastic members are aligned in the rotational direction in this damper disk assembly, the radial dimension of the damper disk assembly does not increase unnecessarily in order to accommodate the placement of the second elastic member.

A damper disk assembly in accordance with a ninth aspect of the present invention is the damper disk assembly of the seventh aspect, and provides a plurality of pairs of first elastic members and a plurality of second elastic members. The plurality of second elastic members is placed between the plurality of pairs of first elastic members in the rotational direction. Since two second elastic members of this damper disk assembly, for example, are placed between the two pairs of first elastic members in the rotational direction, the radial dimension of this damper disk assembly does not increase unnecessarily to accommodate the placement of the second elastic members.

A damper mechanism in accordance with a tenth aspect of the present invention is the damper disk assembly of the ninth aspect, wherein the second elastic member is placed in such a way that radial position of the second elastic member at least overlaps with that of the first elastic members. In other words, the distance from a portion of the second elastic member to the axis of rotation is equal to the distance from a portion of the first elastic members to the axis. Since the radial position of the second elastic members at least overlaps with that of the pair of first elastic members in this damper disk assembly, the radial dimension of this damper disk assembly does not increase unnecessarily to accommodate the placement of the second elastic members.

In a damper disk assembly in accordance with an eleventh aspect of the present invention, the second elastic member is placed in the same radial direction position as that of the first pair of elastic members. In other words, the distance from the second elastic members and the first elastic members to the axis of rotation are equal. Since the radial position of the second elastic members is the same as that of the pair of first elastic members in this damper disk assembly, the radial dimension of this damper disk assembly does not increase unnecessarily to accommodate the placement of the second elastic members.

A damper disk assembly in accordance with a twelfth aspect of the present invention is the damper disk assembly of the seventh to eleventh aspects, and further includes a supporting member placed between the pair of first elastic members in the rotational direction to support the pair of first elastic members at their ends in the rotational direction. Since the supporting member supports the pair of first elastic members at their ends in the rotational direction, the positions of the first elastic members are properly maintained in this damper disk assembly.

In a damper disk assembly in accordance with a thirteenth aspect of the present invention is the damper disk assembly of the seventh to twelfth aspects, wherein a rotational direction gap of a certain angle is secured between rotational direction ends of the second supporting part and second supporting area on one rotational side, and a rotational direction end of the second elastic member. The second elastic member of this damper disk assembly is not compressed even if the first disk member and the second disk member start to rotate relative to each other until the relative rotation reaches a certain angle where the rotational direction end of the second elastic member abuts on the rotational direction ends of the second supporting part and the second supporting area on one rotational side.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

(1) Basic Structure of the Torque Converter

Figure 1:
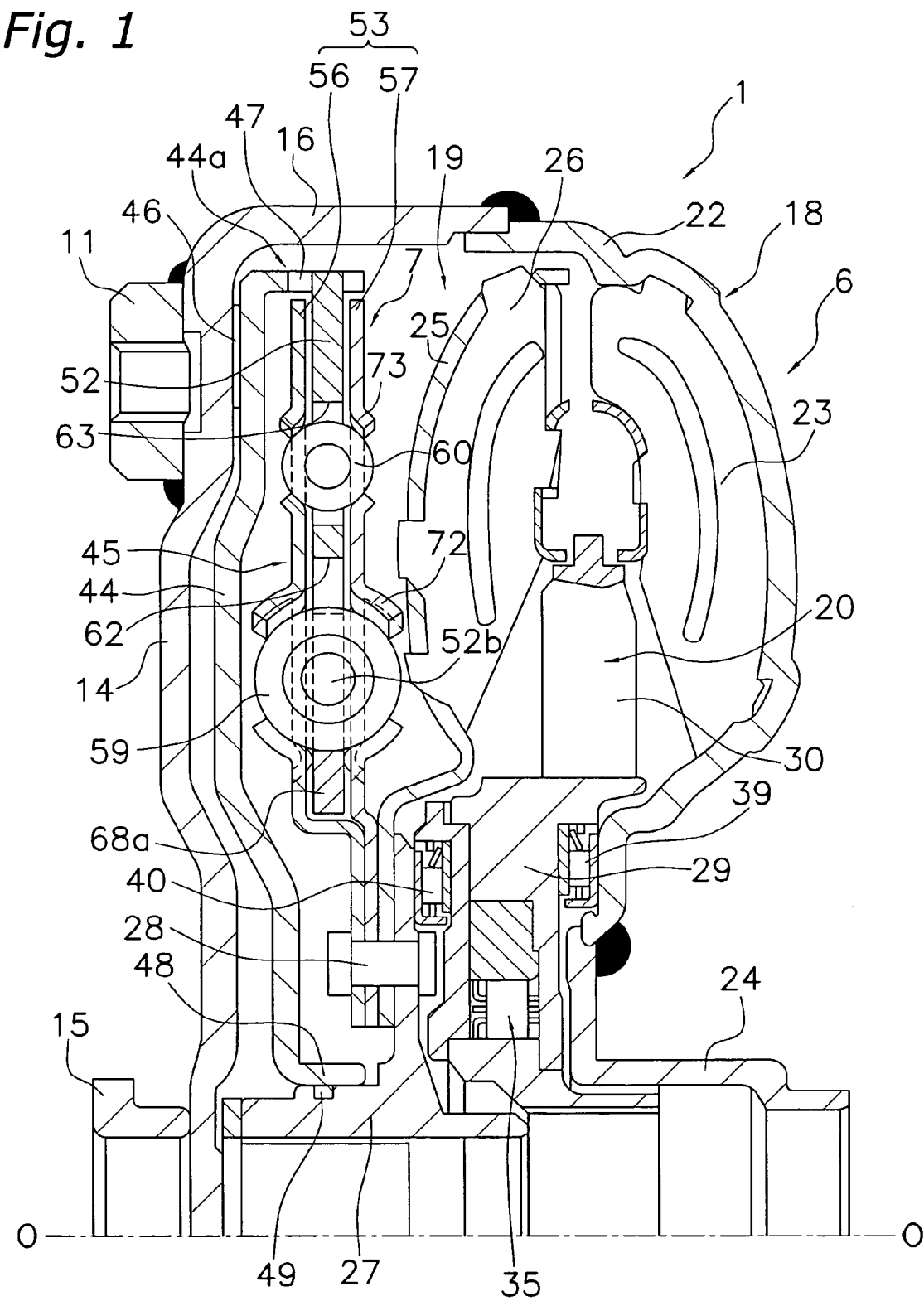
FIG. 1 is a schematic cross-sectional view of a torque converter having a lockup device in accordance with a preferred embodiment of the present invention.

FIG. 1 is a schematic drawing of a vertical cross section of a torque converter 1 in accordance with a first preferred embodiment of the present invention. The torque converter 1 transmits torque from a crankshaft (not shown) of an engine to an input shaft (not shown) of a transmission. The engine (not shown) is located on the left side of FIG. 1, and the transmission (not shown) is located on the right side of FIG. 1. The line O—O shown in FIG. 1 is the axis of rotation of the torque converter 1. The torque converter 1 contains a torus 6 having three kinds of vane wheels (an impeller 18, a turbine 19, and a stator 20), and a lockup device 7.

A front cover 14 is a disk member, which is placed close to an end of the crankshaft of the engine. A center boss 15 is affixed to the radially inward portion of the front cover 14 by welding. A plurality of nuts 11 is affixed to the front cover 14 at radially outward portion on its engine side at an equal interval in the circumferential direction. An outer cylindrical part 16 is formed on the radially outward portion of the front cover 14 extending toward the axial transmission side. The radially outward edge of an impeller shell 22 of the impeller 18 is affixed to the edge of the outer cylindrical part 16. As a consequence, the front cover 14 and the impeller 18 form a fluid chamber in which hydraulic oil (fluid) is contained. The impeller 18 primarily has the impeller shell 22, a plurality of impeller blades 23 affixed inside the impeller shell 22, and an impeller hub 24 affixed to the radially inward edge of the impeller shell 22.

The turbine 19 arranged axially opposite the impeller 18 in the fluid chamber. The turbine 19 primarily has a turbine shell 25 and a plurality of turbine blades 26 affixed on the impeller side face of the turbine shell 25. The radially inward periphery of the turbine shell 25 is affixed to a flange of a turbine hub 27 with a plurality of rivets 28. The turbine hub 27 is connected to the input shaft (not shown) in such a way to forbid any relative rotation.

The stator 20 is a vane wheel that rectifies the flow of the hydraulic oil returning from the turbine 19 to the impeller 18. The stator 20 is preferably made of plastic or aluminum alloy produced as an integral member by casting. The stator 20 is axially placed between the radially inward portion of the impeller 18 and the radially inward portion of the turbine 19. The stator 20 primarily has an annular carrier 29 and a plurality of stator blades 30 provided on the outer periphery of the carrier 29. The carrier 29 is supported by a fixed shaft (not shown) via a one-way clutch 35.

A thrust bearing 39 is placed between the impeller hub 24 and the carrier 29. A thrust bearing 40 is also placed between the carrier 29 and the turbine hub 27.

(2) Lockup Device

Next, the lockup device 7 is described. The lockup device 7 primarily has a piston member 44 and a damper disk assembly 45. The piston member 44 is a disk-like member axially placed close to the front cover 14 on the engine side. An inner cylindrical part 48 is formed on the radially inward portion of the piston member 44 extending toward the axial transmission side. The inner cylindrical part 48 is supported such that it is able to rotate and to move axially relative to an outer circumference of the turbine hub 27. The axial motion of the inner cylindrical part 48 is limited on the transmission side to a specified position by the flange part of turbine hub 27 because the inner cylindrical part 48 is configured to abut thereagainst. A seal ring 49 is placed on an outer circumference of the turbine hub 27. The seal ring 49 seals the axial spaces on the inner circumference of the piston member 44 between the turbine hub 27 and the piston member 44.

Figure 2:
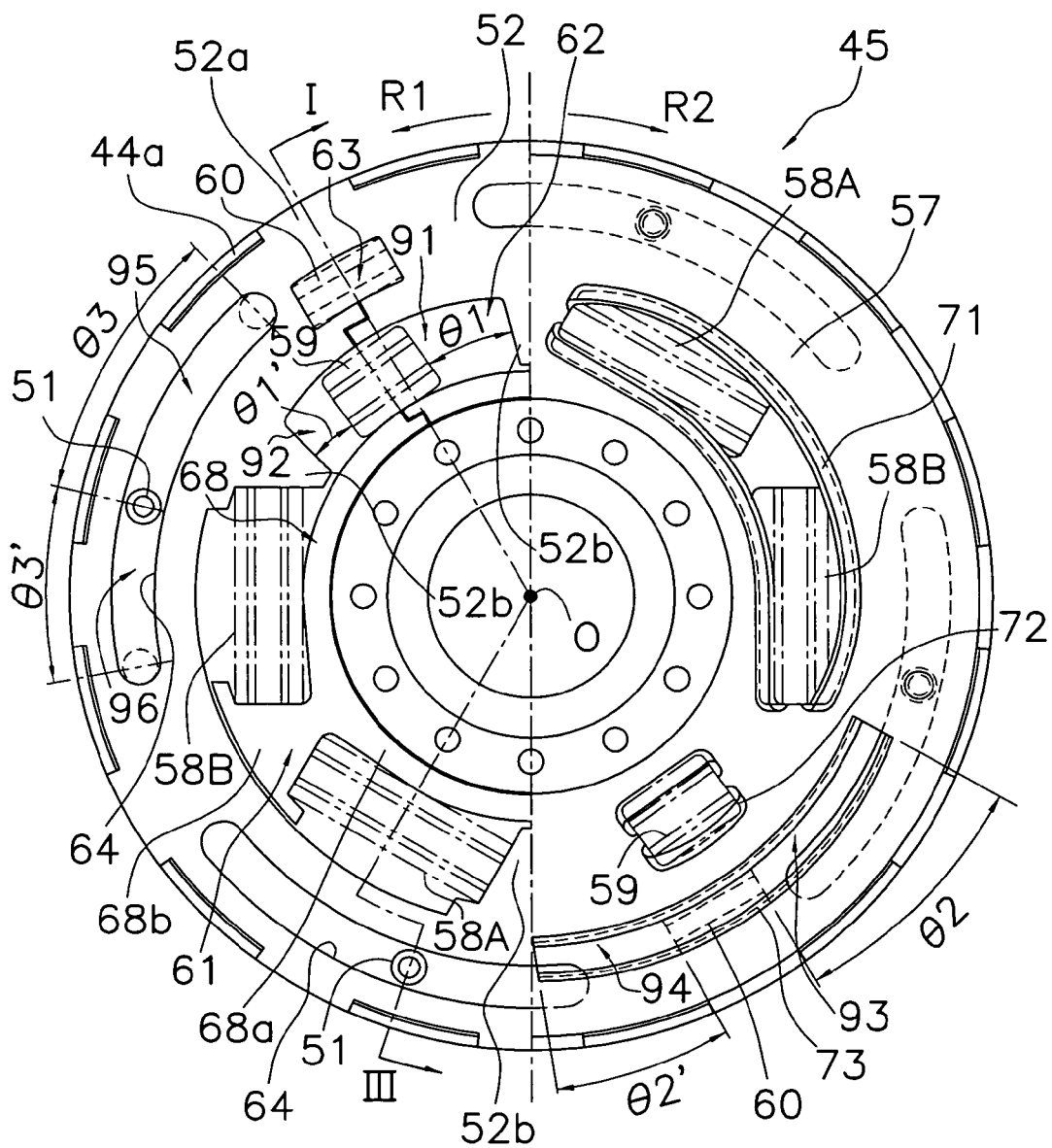
FIG. 2 is an elevational view of the damper disk assembly of the lockup device.
Figure 3:
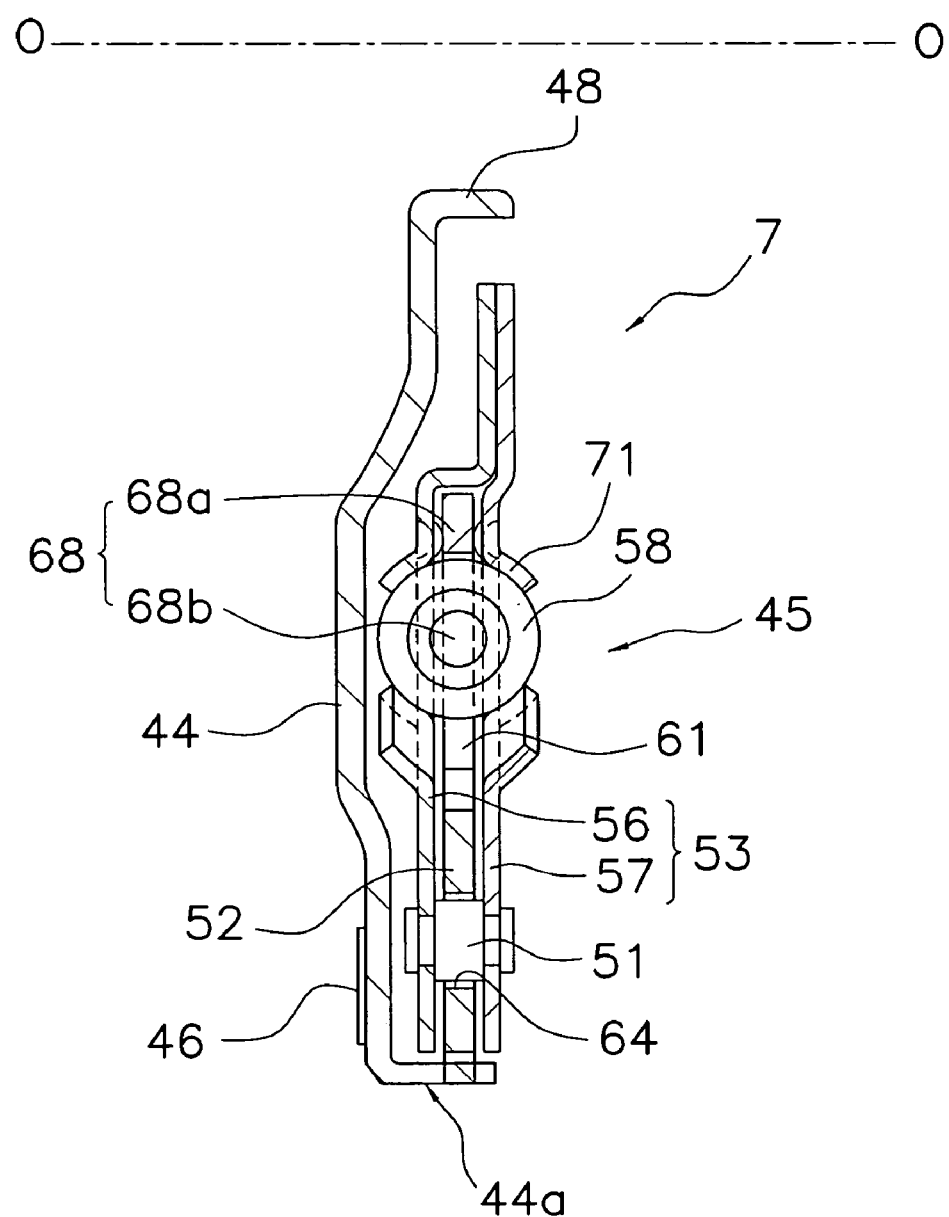
FIG. 3 is a cross-sectional view of the damper disk assembly taken along line segments beginning at a center of the damper disk assembly indicated by 0 and continuing to an outer periphery indicated by III of FIG. 2.

A radially outward circumference portion of the piston member 44 functions as a clutch engagement part. An annular friction facing 46 is affixed on the piston member 44 on the engine side outer periphery. The friction facing 46 faces an annular flat friction plane formed on the inside of the radially outward portion of the front cover 14. Referring to FIGS. 1 and 2, a cylindrical part 44a is formed on the radially outward portion of the piston member 44. The cylindrical part 44a extends axially toward the transmission side. Further, a plurality of slots 47 is provided on this cylindrical part 44a at equal angle intervals.

The damper disk assembly 45 elastically connects the piston member 44 with the turbine 19 in the rotational direction, and absorbs torsional vibration as well as transmits torque from the piston member 44 to the turbine 19. The damper disk assembly 45 has a drive member 52 (first rotating member), a driven member 53 (second rotating member), and a plurality of torsion springs 58, 59, and 60 (first, second, and third elastic members, respectively). The driven member 53 mainly has a pair of plate members 56 and 57. The left side of a single dot chain line of FIG. 2 shows the damper disk assembly 45 with the plate member 57 removed.

Still referring to FIGS. 1 and 2, the drive member 52 is an annular disk-shape member having a plurality of protrusions 52a protruding radially outward. The protrusions 52a engage with the slots 47 formed on the cylindrical part 44a of the piston member 44 and serve as a torque input part through which the torque is input from the piston member 44. As a result of this engagement, the piston member 44 and the drive member 52 rotate together as a unit in the rotating direction although they can move axially relative to each other.

A plurality of protrusions 52b is formed on the inner periphery of the drive member 52 extending radially inward. The spaces provided between the protrusions 52b form spring support openings 61 and 62. The first spring support opening 61 (first supporting part) is an opening relatively long in the rotational direction and is formed at two radially opposite places. The second spring support opening 62 (second supporting part) is an opening relatively short in the rotational direction and is formed between first spring support openings 61 in the rotational direction at radially opposite positions. Each protrusion 52b has a trapezoidal shape with a width that narrows as the protrusion 52b extends radially inward.

The drive member 52 also has third spring support openings 63 (third supporting part) and stopper slits 64 formed therein. The third spring support openings 63 are formed radially outward of the first and second spring openings 61 and 62. The radial positions of the third spring support openings 63 preferably match with those of the second spring support openings 62. In other words, the third spring support openings 63 lie on the same radii of the damper disk assembly 45 as the second sprong support openings 62. The third spring support openings 63 have a shorter length in the rotational direction than those of the second spring support openings 62. The slits 64 are formed radially outward of the first and second spring openings 61 and 62. The slits 64 are formed at four places in the rotational direction. Each slit 64 has an arc-like shape that extends lengthwise in the rotational direction.

A pair of plate members 56 and 57 that constitute the driven member 53 is arranged on both axial sides of the drive member 52. First through third spring support lips 71 through 73 are formed on the plate members 56 and 57 corresponding to the first through third spring support openings 61 through 63 of the drive member 52. The first through third spring support lips 71 through 73 are windows having lips opening axially outward on both radial direction sides. The first spring support lip 71 (first supporting area) has a length in the rotational direction which is equal to that of the first spring support opening 61. The second spring support lip 72 (second supporting area) has a length in the rotational direction which is shorter than that of the second spring support opening 62 and is located inside of the second spring support opening 62 in the rotational direction. The third spring support lip 73 (third supporting area) has a length in the rotational direction which is longer than that of the third spring support opening 63 and extends outside of the third spring support opening 63 in the rotational direction.

The radially inward portions of the plate members 56 and 57 contact each other and are firmly affixed to the flange of the turbine hub 27 by the aforementioned rivets 28 together with the radially inward portion of the turbine shell 25.

The first torsion springs 58, second torsion springs 59, and third torsion springs 60 are provided as the members that constitute an elastic connecting part of the damper disk assembly 45. There are preferably two pair or four first torsion springs 58. There preferably two second torsion springs 59, and two third torsion springs 60. These torsion springs 58 through 60 are preferably coil springs, and are compressed in the rotational direction between the drive member 52 and the driven member 53 as the drive member 52 and the driven member 53 rotate relative to each other.

The first torsion springs 58 and the second torsion springs 59 are parent and children type springs. These springs can be single coil springs.

Each first torsion spring 58 is placed in the first spring support opening 61 and the first spring support lip 71 and is supported by them in radial and rotational directions respectively. Further, both sides at the first torsion spring 58 are axially supported by the first spring support lip 71. More specifically, a pair of first torsion springs 58A and 58B is placed in one of the first spring support openings 61 and one of the first spring support lips 71, aligned with each other in the rotational direction, i.e. shares the same circumference relative to the axis of rotation. The rotationally outer ends of the pair of first torsion springs 58A and 58B are in contact with protruding parts 52b respectively. The rotationally inner ends of the pair of first torsion springs 58A and 58B abut supporting parts 68b (supporting member) of an intermediate floating member 68 respectively. The intermediate floating member 68 is an annular disk-shaped member placed on the radially inward portion side of the drive member 52 axially between a pair of plate members 56 and 57. The intermediate float member 68 has an annular part 68a and a pair of supporting parts 68b extends radially outward from its radially outer periphery. Each supporting part 68b intrudes into the first spring support opening 61 at a rotational direction center and abuts the inner ends of the pair of first torsion springs 58A and 58B in the rotational direction. The supporting part 68b is formed in a fan shape with its width broadening toward the radially outside. In summary, the supporting part 68b is placed between the pair of first torsion springs 58A and 58B in the rotational direction to support the pair of first torsion springs 58A and 58B at their rotational ends. Further, both supporting parts 68b are connected by the annular part 68a to rotate as a unit. Since the supporting part 68b supports the pair of first torsion springs 58A and 58B at their ends in the rotational direction, the posture and position of the pair of first torsion springs 58A and 58B is properly maintained.

The second torsion spring 59 is placed in the second spring support opening 62 and the second spring support lip 72 and is supported by them in radial and rotational directions. Further, both sides of the second torsion spring 59 are axially supported by the second spring support lip 72. While the rotational ends of the second torsion spring 59 abut radially extending portions of the second spring support lip 72 in the rotational direction, they are separated from the ends of the second spring support opening 62 in the rotational direction in a neutral position of the damper disk assembly 45. As shown FIG. 2, the gap between the end of the second torsion spring 59 on the R2 rotational direction side and the protrusion 52b on the R2 rotational direction side of the second torsion spring 59 is denoted as the first rotational direction gap 91 ($\theta 1$). Further, the gap between the end of the second torsion spring 59 on the R1 rotational direction side and the protrusion 52b on the R1 rotational direction side of the second torsion spring 59 is denoted as the fourth rotational direction gap 92 ($\theta 1'$).

The third torsion spring 60 is placed in the third spring support opening 63 and the third spring support lip 73 and is supported by them in radial and rotational directions. Further, both axial sides of the third torsion spring 60 are axially supported by the third spring support lip 73. While the rotational ends of the third torsion spring 60 abut radially extending portions of the third spring support opening 63 in the rotational direction, they are separated from the ends of the third spring support lip 73 in the rotational direction in a neutral position of the damper disk assembly 45. As seen in FIG. 2, the gap between the end of the third torsion spring 60 on the R1 rotational direction side and the end of the third spring support lip 73 on the R1 rotational direction side of the third torsion spring 60 is denoted as the second rotational direction gap 93 ($\theta2$). Further, the gap between the end of the third torsion spring 60 on the R2 of rotational direction side and the end of the third spring support lip 73 on the R2 rotational direction side of the third torsion spring 60 is denoted as the fifth rotational direction gap 94 ($\theta2'$).

The first plate member 56 and the second plate member 57 are affixed to each other by a plurality of stopper pins 51 on the outer periphery side. Thus, the first and second plate members 56 and 57 rotate together as a unit and their axial positions are determined. The stopper pins 51 axially extend through the slits 64 of the drive member 52. Each stopper pin 51 is movable in either rotational direction within the slit 64. When the stopper pin 51 abuts a rotational end of the slit 64, the relative rotation of the drive member 52 and the driven member 53 stops. In other words, a stopper system of the damper disk assembly 45 is realized by the stopper pin 51 and the slit 64. The gap between the stopper pin 51 and the end of the slit 64 in the rotational direction R2 is denoted as a third rotational direction gap 95 ($\theta3$), and the gap between the stopper pin 51 and the end of the slit 64 in the rotational direction R1 is denoted as a sixth rotational direction gap 96 ($\theta3'$).

The angles $\theta1$, $\theta2$, and $\theta3$ of the first through third rotational direction gaps 91, 93 and 95 must have a relation of $\theta1<\theta2<\theta3$. Moreover, the angles $\theta1'$, $\theta2'$, and $\theta3'$ of the fourth through sixth rotational direction gaps 92, 94, and 96 must have a relation of $\theta1'<\theta2'<\theta3'$. Further, $\theta1$ and $\theta1'$, $\theta2$ and $\theta2'$, and $\theta3$ and $\theta3'$ can be either equal or different respectively.

(3) Operation

The torque is transmitted from the crankshaft of the engine (not shown) to the front cover 14 and the impeller 18. The hydraulic oil driven by the impeller blades 23 of the impeller 18 causes the turbine 19 to rotate. The torque of the turbine 19 is output to the input shaft (not shown) via the turbine hub 27. The hydraulic oil that flows from the turbine 19 to the impeller 18 flows through the passages of the stator 20 toward the impeller 18.

When the hydraulic oil in the space between the front cover 14 and the piston member 44 is drained from the inner periphery thereof, the piston member 44 moves toward the front cover 14 due to the hydraulic pressure difference and the friction facing 46 is pressed against the friction surface of the front cover 14. As a result, the torque is transmitted from the front cover 14 to the turbine hub 27 via the lockup device 7.

Figure 4:
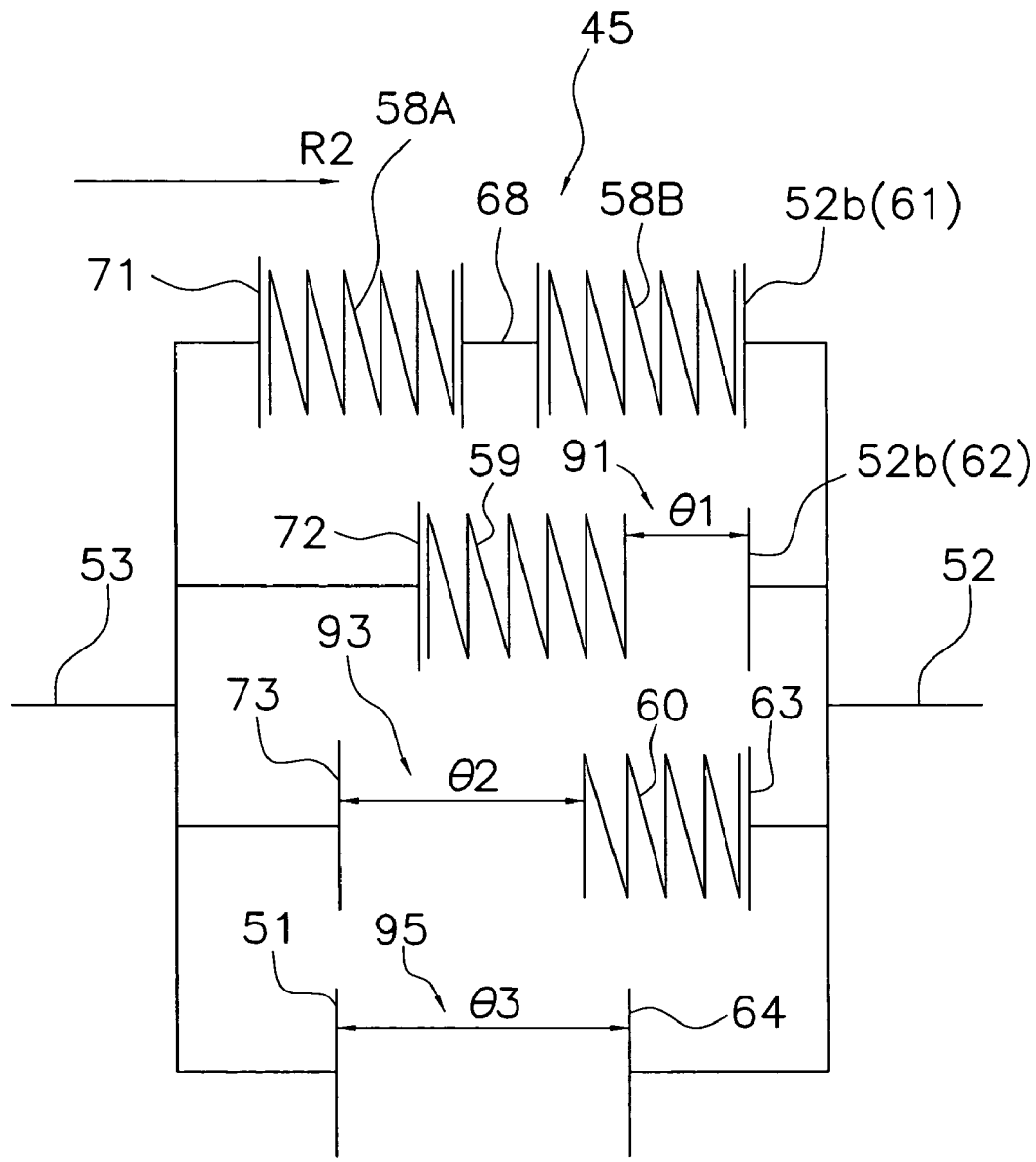
FIG. 4 is a view of a mechanical circuit diagram of the damper disk assembly of the lockup device.
Figure 5:
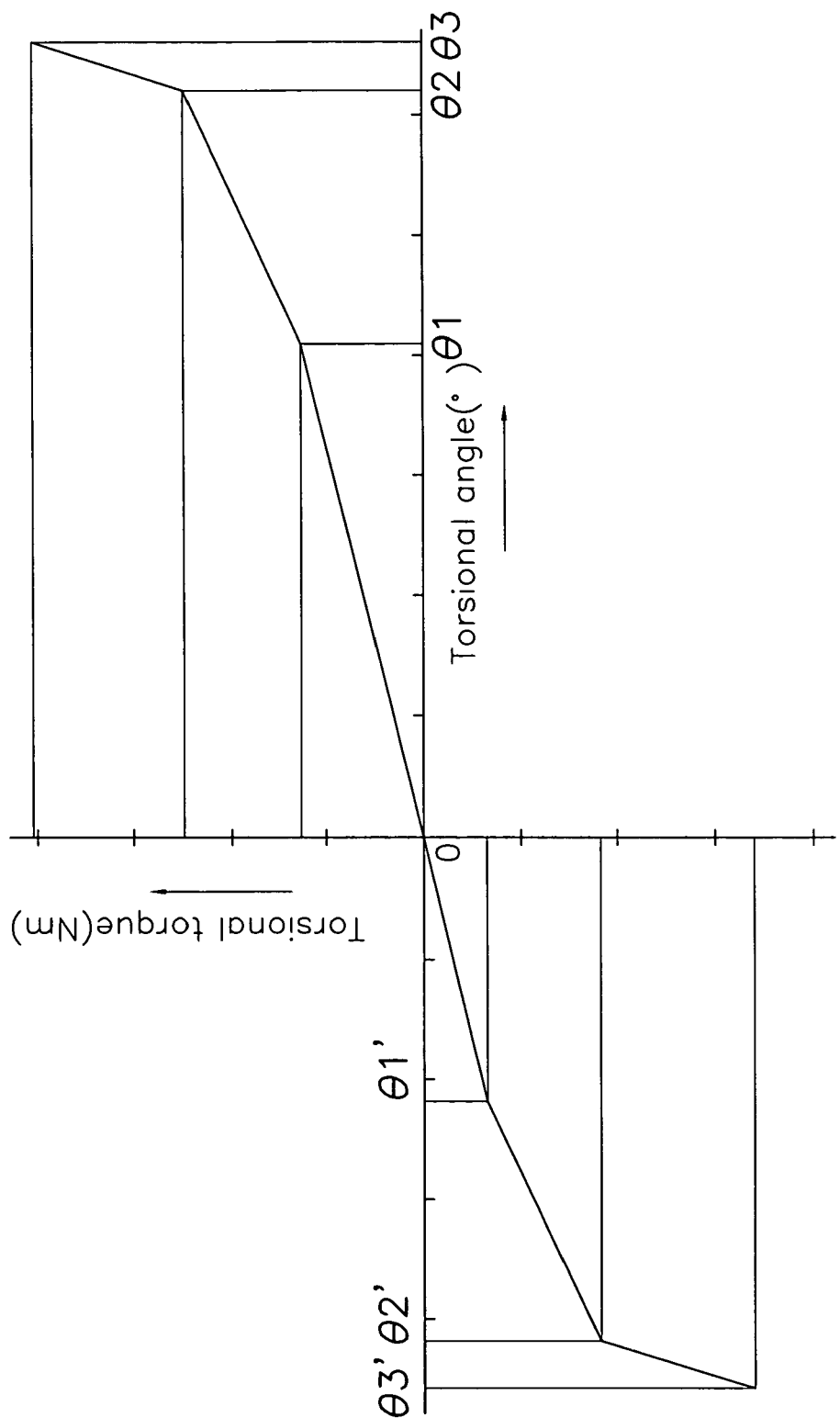
FIG. 5 is a view of a torsion characteristic diagram of the damper disk assembly of the lockup device.

Next, description will be directed to the torsion characteristics of the damper disk assembly 45 shown in FIG. 5 using the mechanical circuit diagram of FIG. 4. FIG. 4 is a diagram for illustrating the positive side of the torsion characteristics (right half of FIG. 5). Starting from the neutral state shown in FIG. 4, the driven member 53 is twisted in the rotating direction R2 relative to the drive member 52. At this time, the drive member 52 is twisted toward the rotating direction R1 relative to the driven member 53, i.e., the drive side of the rotating direction. In the region up to the torsion angle $\theta1$, each pair of first torsion springs 56A and 58B is compressed in parallel to each other or independently in the rotational direction. Further, within each pair of first torsion spring 58A and 58B, the springs 58A and 58B are compressed in series with each other or in end to end pushing relation in the pair. Since the pair of first torsion springs 58A and 58B is compressed in series in between members 52 and 53, a characteristic with a relatively low rigidity is achieved. To describe the operation of each pair more specifically, the pair of first torsion springs 58A and 58B (two pairs) is compressed via the intermediate float member 68 in the rotational direction between the end of the first spring support lip 71 in the rotational direction R1 and the end of the first spring support opening 61 in the rotational direction R2. At this time, the intermediate float member 68 rotates relative to the drive member 52 and the driven member 53 in accordance with the compression of the pair of first torsion springs 58A and 58B.

When the torsion angle reaches $\theta1$, the compression of the two second torsion springs 59 starts. More specifically, each second torsion spring 59 is compressed in the rotational direction between the end of the second spring lip 72 in the rotational direction R1 and the end of the second spring support opening 62 in the rotational direction R2. As a consequence, the pairs of first torsion springs 58A and 58B (two pairs) and the second torsion springs 59 (two pieces) are compressed in parallel between members 52 and 53 in the rotational direction and provide a relatively high torsion rigidity.

When the twisting angle reaches $\theta2$ (i.e., when it is twisted for the amount of $\theta2-\theta1$ from the torsion angle of $\theta1$), the compression of two third torsion springs 60 starts. More specifically, the third torsion spring 60 is compressed in the rotational direction between the end of the third spring support lip 73 in the rotational direction R1 and the end of the third spring support opening 63 in the rotational direction R2. As a consequence, the two pairs of first torsion springs 58A and 58B, two second torsion springs 59, and two third torsion springs 60 are compressed in parallel to provide an even higher rigidity the second stage characteristic, i.e. a third stage characteristic.

When the torsion angle reaches $\theta3$ (i.e., when it is twisted for the amount of $\theta3-\theta2$ from the torsion angle of $\theta2$), the stopper pin 51 abuts on the end of the slit 64 in the rotational direction R2, thus ending the twisting motion of the driven member 53 relative to the drive member 52 ends.

Since the characteristic of the negative side of torsion characteristic (i.e., left half of FIG. 5) of twisting the driven member 53 relative to the drive member 52 in the rotational direction R1 is similar to the above, the description is omitted.

As is apparent from the above description, a low rigidity characteristic is achieved as the pair of first torsion springs 58A and 58B is compressed in series or end to end contact relationship up to the first stage, i.e., up to the torsion angle of $\theta1$, while in the second stage, i.e., from the torsion angle of $\theta1$ to $\theta2$, the second torsion spring 59 is compressed independently with the pair of first torsion springs 58A and 58B, thus providing the rigidity of the second stage. By realizing the second stage characteristic in the region of larger torsion angles, it is possible to provide a lower rigidity than in the prior art in the first region with smaller torque.

(4) Effects of Placements of the Springs

Referring again to FIGS. 1 and 2, the damper disk assembly 45 is equipped with the drive member 52, the driven member 53, the pair of first torsion spring 58, and the second torsion spring 59. The drive member 52 has the first and second spring support openings 61 and 62 aligned in the rotational direction. The driven member 53 is placed on one side of the drive member 52 in the axial direction, and has the first and second spring support lips 71 and 72 corresponding to the first and second spring support openings 61 and 62 respectively. The pair of first torsion springs 58 is placed inside the first spring support opening 61 and the first spring support lip 71. The first torsion springs 58A and 58B are aligned in the rotational direction and functionally provided in series with each other in the rotational direction. The second torsion spring 59 is placed in the second spring support opening 62 and in the second spring support lip 72. The second torsion spring 59 is functionally provided in parallel with the pair of first torsion springs 58 in the rotational direction in such a way that the second torsion spring 59 is compressed in the rotational direction after the pair of first torsion springs is compressed for a certain angle.

In this damper disk assembly 45, the compression of the pair of first torsion springs 58 begins first as the drive member 52 and the driven member 53 rotate relative to each other. At this time, a relatively low rigidity is achieved as the pair of first torsion spring 58 is compressed in the rotating direction. When the relative rotation between the drive member 52 and the driven member 53 reaches a certain angle, the compression of the second torsion spring 59 starts next. At this time, a relatively high rigidity is achieved as the second torsion spring 59 is compressed in parallel to the pair of first torsion springs 58 in the rotating direction. Consequently, the combination of the pair of first torsion springs 58 and the second torsion springs 59 results in achieving a characteristic having a combination of low rigidity and high rigidity.

As described before, the second torsion spring 59 is placed between the pair of first torsion springs 58A and 58B in the rotational direction (at a different position in the rotational direction), further at a position at least overlapping in the radial direction, and preferably at the same position in the radial direction. What is meant here by "a position overlapping in the radial direction" is that, an annular region is assigned for each spring to have an outer diameter and an inner diameter that coincide with the outer periphery and the inner periphery of the spring, the annular regions for two springs share an overlapping area. What is meant here by "same position in the radial direction" means that the center positions of two springs in the radial directions substantially match with each other. By placing the springs this way, the placement of second torsion spring 59 does not unnecessarily increase the radial dimension of the damper disk assembly 45. In other words, it is possible to achieve the damper disk assembly 45 of a compact size even when an excellent torsion characteristic is realized as described above.

ALTERNATE EMBODIMENTS

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the second embodiment that are identical to the parts of the first embodiment may be omitted for the sake of brevity.

(5) Alternate Embodiments

The invention is not limited to the abovementioned embodiment format but rather various other changes and modifications are possible within the gist of the invention. For example, the structure of the lockup device is not limited to the abovementioned embodiment.

Although there are two pairs of first elastic members are provided in said embodiment, three pairs of them can be provided. In that case, three second elastic parts can be provided as well. The invention can be applied not only to the lockup device of the torque converter but also in other devices such as the clutch-disk assembly and the flywheel assembly.

Effect of the Invention

Thus, the combination of the pair of the first elastic members and the second elastic member results in achieving a characteristic having a combination of a low rigidity and a high rigidity and an improved noise and vibration suppression performance in the damper mechanism and the damper disk assembly according to the present invention.

As used herein, the following directional terms "forward, rearward, above, downward, vertical, horizontal, below, and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-073878. The entire disclosure of Japanese Patent Application No. 2003-073878 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A damper mechanism comprising:
    a first rotating member being axially movably and unrotatably attached to a piston;
    a second rotating member being configured to rotate relative to said first rotating member, said second rotating member being fixed to a hub and arranged on both axial sides of said first rotating member;
    a pair of first elastic members, said first elastic members being aligned in a rotational direction to operate in series with each other in said rotational direction; and
    a second elastic member being configured to operate in parallel with said pair of first elastic members in said rotational direction, said second elastic member being configured to be compressed in said rotational direction after said pair of first elastic members is compressed to a first angle due to relative rotation of said first rotating member and said second rotating member.

2. The damper mechanism according to claim 1, wherein said second elastic member and said pair of first elastic members are aligned in said rotational direction.

3. The damper mechanism according to claim 2, wherein a plurality of said pair of first elastic members is provided, and a plurality of said second elastic members is placed between said plurality of pairs of first elastic members in said rotational direction.

4. The damper mechanism according to claim 3, wherein said second elastic member is placed in a radial position to overlap with the radial position of said first elastic members.

5. The damper mechanism according to claim 4, wherein said second elastic member is placed in the same radial position as that of said first elastic members.

6. The damper mechanism according to claim 5, further comprising a supporting member arranged between one elastic member of said pair of first elastic members and the other elastic member of said pair of first elastic members in said rotational direction, said supporting member being configured to contact rotational ends of said pair of first elastic members.

7. The damper mechanism according to claim 2, wherein said second elastic member is placed in a radial position to overlaps with the radial position of said first elastic members.

8. The damper mechanism according to claim 7, wherein said second elastic member is placed in the same radial position as that of said first elastic members.

9. The damper mechanism according to claim 1, further comprising a supporting member arranged between one elastic member of said pair of first elastic members and the other elastic member of said pair of first elastic members in said rotational direction, said supporting member being configured to contact rotational ends of said pair of first elastic members.

10. The damper mechanism according to claim 1, further comprising a third elastic member being configured to operate in parallel with said pair of first elastic members and said second elastic member in said rotational direction, said third elastic member being configured to be compressed in said rotational direction after said pair of first elastic members is compressed to said first angle and said second elastic member is compressed to a second angle due to relative rotation of said first rotating member and said second rotating member.

11. The damper mechanism according to claim 10, further comprising a stopper mechanism that stops relative rotation of said first and second rotating member at a third angle.

12. The damper mechanism according to claim 11, wherein said second angle is larger than said first angle, and said third angle is larger than said second angle.

13. A damper disk assembly comprising:
a first disk member having first and second supporting parts arranged in a rotational direction, said first disk member being axially movably and unrotatably attached to a piston;
a second disk member being arranged on both axial sides of said first disk member, said second disk member having first and second supporting areas corresponding to said first and second supporting parts respectively, and said second disk member being fixed to a hub;
a pair of first elastic members being arranged inside said first supporting part and first supporting area, said pair of elastic members being aligned in said rotational direction to operate in series with each other in said rotational direction; and
a second elastic member being arranged inside said second supporting part and said second supporting area, said second elastic member being configured to operate in parallel with said pair of first elastic members in said rotational direction after said first elastic members are compressed to a first angle due to relative rotation of said first and second disk members.

14. The damper disk assembly according to claim 13, wherein said second elastic member and said pair of first elastic members are aligned in said rotational direction.

15. The damper disk assembly according to claim 13, wherein a plurality of said pair of first elastic members is provided, and a plurality of second elastic members is placed between said plurality of pairs of first elastic members in said rotational direction.

16. The damper disk assembly according to claim 15, wherein said second elastic member is placed in a radial position to overlap with the radial position of said first elastic members.

17. The damper disk assembly according to claim 16, wherein said second elastic member is placed in the same radial position as that of said first elastic members.

18. The damper disk assembly according to claim 13, further comprising a supporting member arranged between one elastic member of said pair of first elastic members and the other elastic member of said pair of first elastic members in said rotational direction, said supporting member being configured to contact rotational ends of said pair of first elastic members.

19. The damper disk assembly according to claim 13, wherein a first rotational direction gap of a certain angle is secured between a rotational direction end of said second supporting part on one rotational side and a rotational direction end of said second elastic member.

20. The damper disk assembly according to claim 19, further comprising a third elastic member being arranged in a third supporting part of said first disk member and a third supporting area of said second disk member, wherein
a second rotational direction gap is secured between a rotational direction end of said third supporting area on one rotational side and a rotational direction end of said third elastic member.

21. A damper mechanism comprising:
a first rotating member being axially movably and unrotatably attached to a piston;
a second rotating member being configured to rotate relative to said first rotating member;
a pair of first elastic members, said first elastic members being aligned in a rotational direction to operate in series with each other in said rotational direction; and
a second elastic member being configured to operate in parallel with said pair of first elastic members in said rotational direction, said second elastic member being configured to be compressed in said rotational direction after said pair of first elastic members is compressed to a first angle due to relative rotation of said first rotating member and said second rotating member.

* * * * *